(12) United States Patent
Lee

(10) Patent No.: US 10,726,441 B2
(45) Date of Patent: Jul. 28, 2020

(54) STRUCTURE AND METHOD FOR ONLINE STORE LOCATED WITHIN BRICKS-AND-MORTAR STORE

(71) Applicant: Youn Jae Lee, Pleasanton, CA (US)

(72) Inventor: Youn Jae Lee, Pleasanton, CA (US)

( * ) Notice: Subject to any disclaimer, the term of this patent is extended or adjusted under 35 U.S.C. 154(b) by 897 days.

(21) Appl. No.: 14/884,753

(22) Filed: Oct. 15, 2015

(65) Prior Publication Data
US 2017/0109777 A1   Apr. 20, 2017

(51) Int. Cl.
G06Q 30/00 (2012.01)
G06Q 30/02 (2012.01)
G06Q 30/06 (2012.01)

(52) U.S. Cl.
CPC ..... *G06Q 30/0238* (2013.01); *G06Q 30/0237* (2013.01); *G06Q 30/0239* (2013.01); *G06Q 30/0629* (2013.01)

(58) Field of Classification Search
CPC ............... G06Q 30/0238; G06Q 30/0237
USPC ................................................ 705/26.1
See application file for complete search history.

(56) References Cited

U.S. PATENT DOCUMENTS

| 8,706,631 | B2* | 4/2014 | Gupta | G06Q 30/0601 455/406 |
| 2009/0265251 | A1* | 10/2009 | Dunlap | G06Q 10/087 705/26.1 |
| 2011/0106663 | A1* | 5/2011 | Scozzafava | G06Q 30/06 705/27.1 |
| 2012/0117129 | A1* | 5/2012 | Wang | H04L 65/4084 707/827 |
| 2012/0310745 | A1* | 12/2012 | Bhatia | G06Q 30/02 705/14.66 |
| 2014/0279294 | A1* | 9/2014 | Field-Darragh | G06Q 10/087 705/28 |

OTHER PUBLICATIONS

Pervasive computing technologies for retail in-store shopping (Year: 2005).*

* cited by examiner

*Primary Examiner* — Jeffrey A. Smith
*Assistant Examiner* — Lalith M Duraisamygurusamy
(74) *Attorney, Agent, or Firm* — Imperium Patent Works; T. Lester Wallace

(57) ABSTRACT

For each product category offered by an on-line retailer, the most popular or biggest selling products are identified. The on-line retailer competes with a bricks-and-mortar store in the sale of the identified products. A dedicated area is provided within the store. In this area, the store provides, for each identified product, both: 1) a physical purchasable unit of the product, and 2) descriptive information about the product. The descriptive information includes: 1) an identification of the product, 2) an identification of the on-line retailer, 3) a price at which the product is offered on-line by the on-line retailer, and 4) a price at which the product is offered at the store. The customer can use the descriptive information to confirm the prices, and can then purchase a physical unit of the product, and can immediately take the unit from the store without having to wait for, and pay for, shipment.

18 Claims, 4 Drawing Sheets

PHYSICAL RETAIL STORE

FLOOR LAYOUT OF THE PHYSICAL RETAIL STORE

A FIRST EXAMPLE OF A "DEDICATED AREA" WITHIN
THE PHYSICAL RETAIL STORE

A SECOND EXAMPLE OF A "DEDICATED AREA"
WITHIN THE PHYSICAL RETAIL STORE

STRUCTURE AND METHOD FOR ONLINE STORE LOCATED WITHIN BRICKS-AND-MORTAR STORE

TECHNICAL FIELD

The described embodiments relate to the advertisement, display and sale of retail items, and to related methods and structures.

BACKGROUND

Traditionally, physical retail items were sold at the retail level in so-called "bricks-and-mortar" stores. The term "bricks-and-mortar" means that the store is a physical place where there are physical products available for customers to purchase and take out of the store, as opposed to a virtual store that a customer cannot physically frequent. Increasingly today, however, products are sold by so-called "on-line retailers". Typically, a customer of an on-line retailer uses a computer browser to go to an internet web-site maintained by the on-line retailer and uses the web-site to order and pay for a product in an on-line transaction. The purchased product must then be shipped to the customer, so the customer at the time of ordering elects a mode of shipment and pays for the product to be shipped to the customer. As compared to a traditional transaction at a bricks-and-mortar store, the customer typically incurs the added cost of inefficient point-to-point shipment. There is also a substantial delay between the time of purchase and the time when the product eventually arrives in delivered form to the customer. Nonetheless, for various reasons, on-line retailers often take market share from many bricks-and-mortar retailers. Techniques and methods are sought whereby owners of bricks-and-mortar stores can recapture some of this lost market share.

SUMMARY

For each category of product offered on-line by an on-line retailer, the most popular or biggest selling products are identified. The on-line retailer is in competition with a bricks-and-mortar store in the sale of the identified products. A dedicated area is provided within the bricks-and-mortar store. In this dedicated area, the bricks-and-mortar store provides, for each of the identified products, both: 1) a physical purchasable unit of the identified product, and 2) descriptive information about the identified product. The descriptive information includes: 1) an identification of the product, 2) an identification of the on-line retailer, 3) a price at which the product is offered for sale on-line by the on-line retailer, and 4) a price at which the product is offered for sale at the bricks-and-mortar store. In addition to a purchasable unit of each identified product, there also may be provided in the dedicated area a sample unit of the identified product. The sample unit may, for example, be displayed out of its shipping container or packaging, in working and assembled order, so that the customer can examine and interact with the sample unit. The customer can use the descriptive information at the dedicated area within the store to confirm the prices and other information about the two product offerings (as offered on-line by the on-line retailer and as offered in the bricks-and-mortar store). The customer can then obtain a physical purchasable unit of the identified product from the dedicated area, can take the physical purchasable unit to the checkout counter area of the store, can purchase the physical unit from the store, and can immediately upon purchase take the physical unit from the store without having to wait for, or to pay for, handling and shipment as would be the case were the customer to have purchased the very same product on-line from the on-line retailer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
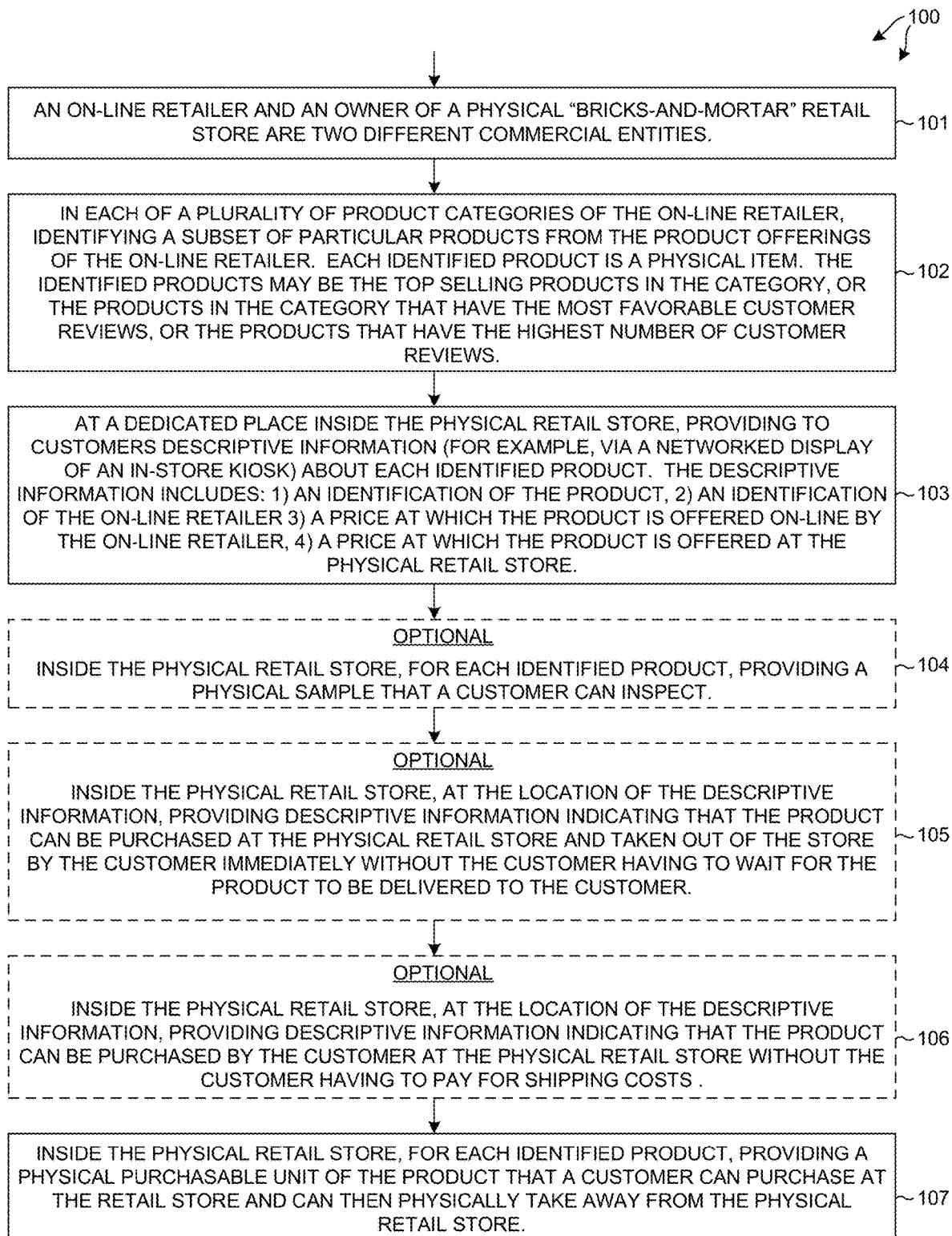
FIG. 1 is a flowchart of a method in accordance with one novel aspect.

FIG. 1 is a flowchart of a method 100 in accordance with one novel aspect. The method 100 involves a physical retail store 108 (i.e., a so-called "bricks-and-mortar" store) and an on-line retail company 109 (step 101). The owner of the physical retail store 108 and the on-line retail company 109 are two different competing commercial entities.

Figure 2:
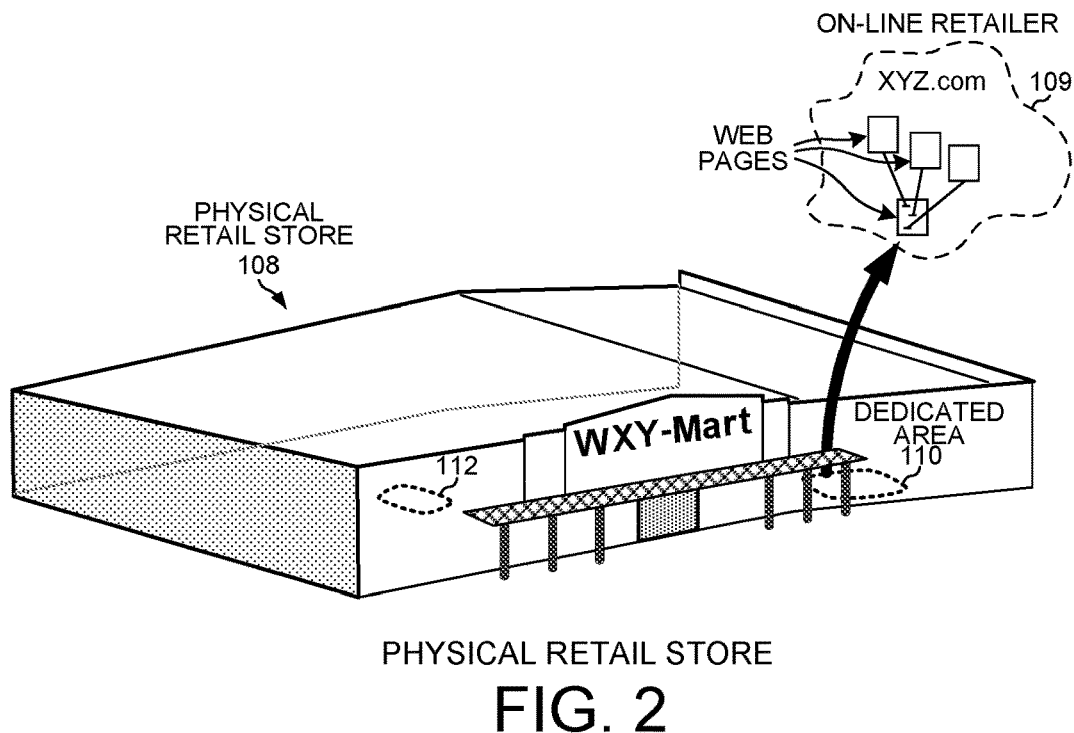
FIG. 2 is a diagram of the physical retail store involved in the method of FIG. 1.

FIG. 2 is a diagram of one example of the physical retail store 108 and a representation of the on-line retail company 109. In one specific example, the on-line retail company (for example, XYZ.com) is an on-line retail company that has been taking substantial sales away from the physical retail store (for example, WXY-Mart).

Figure 3:
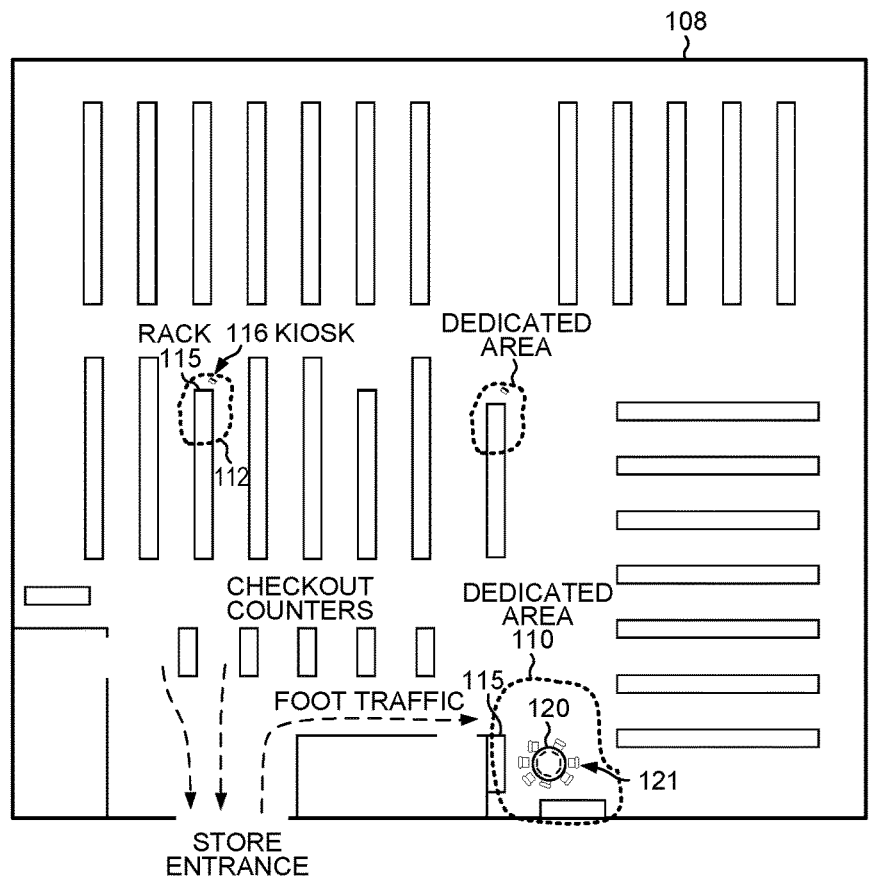
FIG. 3 is a diagram of the floor layout of the physical retail store of FIG. 2.

FIG. 3 is a top-down diagram of the layout of the physical retail store 108. In each of a plurality of product categories of the on-line retail company 109, a subset of particular products is identified (step 102) from the product offerings of the on-line retail company. Each identified product is a physical item. The identified products of a category may, for example, be the top selling products in the category, or may be those products in the category that have the most favorable customer reviews, or may be those products in the category that have the highest number of customer reviews, or may be those products in the category that are determined by analysis of preselected metrics to be the most popular products offered by the on-line retail company. The information used to identify the identified products in the method of FIG. 1 may exclusively be information publicly supplied by the on-line retail company, touting their on-line products. There may, for example, be twenty, thirty, or more products offered by the on-line retail company in a particular category, but only a select two or three of those products are determined in accordance with the method of FIG. 1 to be "identified products" in step 102.

In a dedicated area 110 inside the physical retail store, descriptive information 111 is provided (step 103) to customers about each identified product. The descriptive information 111 includes: 1) an identification of the product, 2) an identification of the on-line retail company, 3) a price at which the product is offered for sale on-line by the on-line retail company, and 4) a price at which the product is offered for sale at the physical retail store. In one example, a fixed large screen display 113 is provided in the dedicated area 110 in the physical retail store. A list of the identified products is displayed on the large screen display 113 along with at least some of the descriptive information about each of the identified products. The information is presented on the large screen display 113 in a size large enough that customers standing ten feet away from the large screen display in the dedicated area 110 can still recognize pictures of the identified products, and can still read descriptive information about each product. Associated with each displayed product is the descriptive information, in printed form, as a sign or placard associated with the identified product. In an optional step, a physical sample unit of each identified product is also provided (step 104) inside the physical retail store at the dedicated area 110.

In one example, there is only one such dedicated area 110 in the store. All the physical sample units are located in the dedicated area 110, where substantially no product other than the sample units of the identified products and purchasable units of the identified products are present in that one dedicated area 110. Whereas products in the physical retail store are otherwise generally organized in racks according to the type of product, the novel dedicated area 110 within the store contains sample units of many different types of products provided that those products are identified products. For example, the store may be organized in multiple product category departments, where each department occupies a different physical part of the store. Examples of some of these departments are home furnishings, electronics, clothing, household essentials, health & beauty, sports & fitness, etc. For products in the store that are not identified products, the products are located in the appropriate department and are not generally located elsewhere in the store. In the case of the identified products, however, a sample unit of each of the identified products is displayed in the one central dedicated area 110 where the descriptive information is being provided.

In another optional step, additional descriptive information is provided (step 105) to the customer, where the additional descriptive information indicates that the product can be purchased at the physical retail store and then taken out of the store by the customer immediately following purchase without having to wait for the product to be shipped to or delivered to the customer. In another optional step, additional descriptive information is provided (step 106) to the customer, where the additional descriptive information indicates that the product can be purchased by the customer at the physical retail store without the customer having to pay for shipping costs. Accordingly, comparative advantages of purchasing one of the relatively small number of identified products at the physical retail store as compared to purchasing the very same product on-line from the on-line retail company are provided to the customer at the dedicated area 110 in the physical retail store 108, and the customer is made aware that if the customer were to purchase the product from the physical retail store then the customer could avoid shipping costs that would be incurred were the customer to purchase the same product from the on-line retail company. The customer is made aware that if the customer were to purchase the product from the physical retail store then the customer could take the product home immediately after purchase without having to wait for handling, shipping and delivery. Importantly, inside the physical retail store, for each identified product, a purchasable physical unit 114 of the identified product is made readily available (step 107) to the customer at the dedicated area 110, so that the customer can purchase the physical purchasable product, and upon purchase can physically take the unit away from the physical retail store. In one example, for each identified product, the dedicated area 110 contains, in addition to a sample unit of the product, a purchasable unit 114 of the product. A customer can therefore obtain a purchasable unit 114 from the dedicated area 110, can purchase the physical unit from the store, and can immediately upon purchase take the physical unit from the store without having to wait for, or to pay for, handling and shipment as would be the case were the customer to have purchased the very same product on-line from the on-line retailer.

Figure 4:
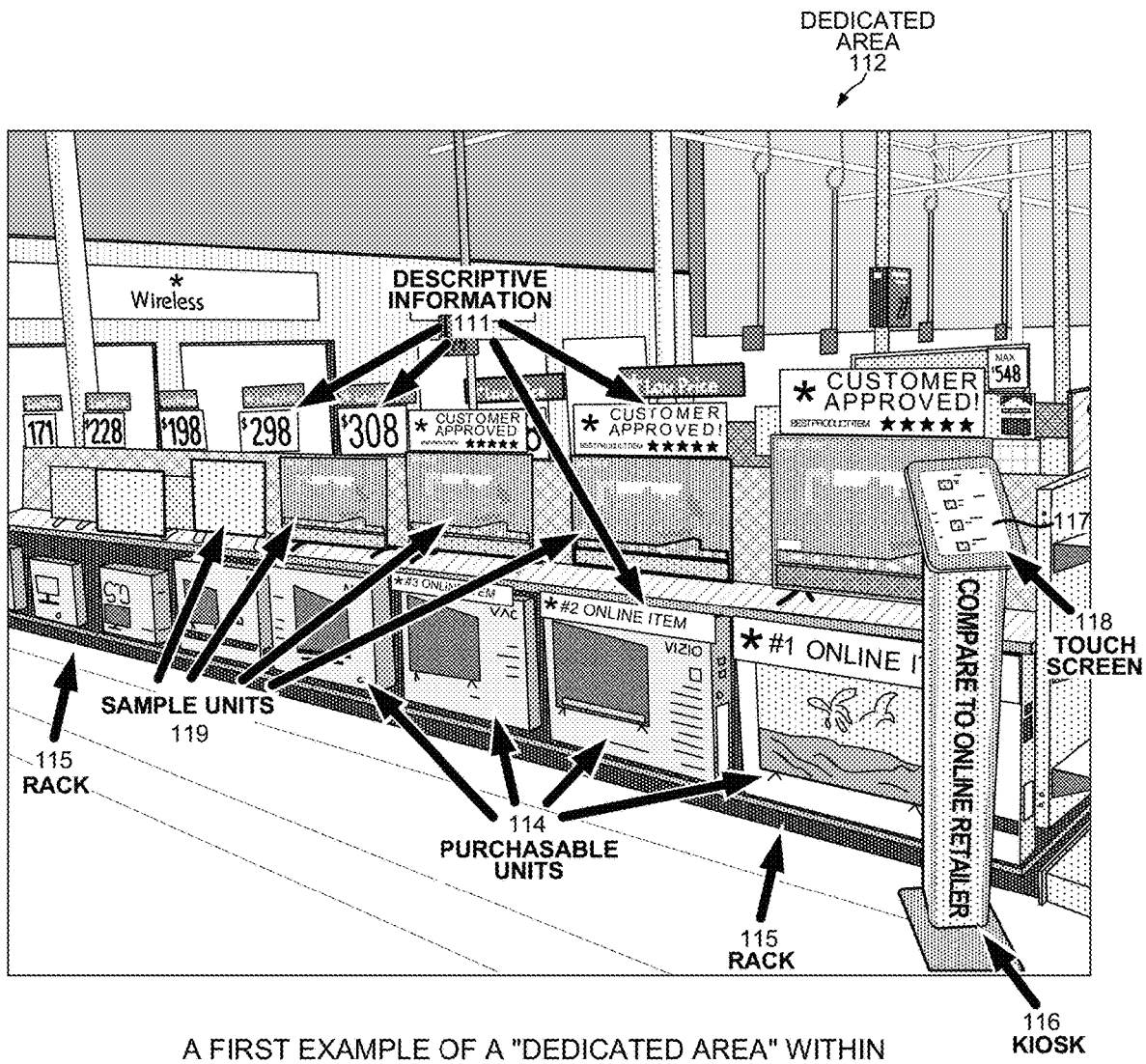
FIG. 4 is a diagram of a first example of a "dedicated area" inside a physical retail store where descriptive information about particular identified products is provided to customers, where sample units of the identified products are provided to customers, and where purchasable units of the identified products are provided to customers.

FIG. 4 is a diagram of a first example of the "dedicated area" described above in connection with FIG. 1. This dedicated area is identified by reference numeral 112 in FIG. 2. The dedicated area 112 in this case is a rack 115, as well as an amount of floor space close to one end of the rack 115 where a novel in-store information kiosk 116 is disposed. The kiosk 116 includes a web-page browsing network device 117 having a touch screen display 118. A customer can use the kiosk 116 to browse through select web pages of the on-line retail company, where the viewable web pages show the identified products and list the price at which each identified product is being offered for sale by the on-line retail company. The rack 115, in this particular example, has a lower shelf and an upper shelf. For each of the identified products, a purchasable unit 114 of the identified product is provided in the lower shelf, a sample unit 119 is provided immediately above the purchasable unit on the upper shelf, and the corresponding descriptive information 111 is set forth immediately above that. The descriptive information includes, among other things, the price at which the identified product is being offered at the physical retail store, and the price at which the identified product is being offered by the on-line retail company. Not all of the descriptive information about a product need necessarily be provided immediately above the purchasable unit, or on the kiosk, but rather some of the descriptive information may be provided in one place and the remainder of the descriptive information may be provided in the other place. The "customer approved" in the diagram of FIG. 4 indicates that the associated identified product is a particularly popular product on-line, as reported by the competing on-line retail company. The "customers" in this case are the on-line customers of the on-line retail company.

In the case of the dedicated area 112 being of the type illustrated in FIG. 4, there may be multiple such dedicated areas in the store, where each dedicated area 112 contains identified products belonging to a corresponding product category associated with the general area where the dedicated area is located. There may, for example, be one such smaller dedicated area 112 located within each larger department area of the store. FIG. 4 shows one such dedicated area 112 for televisions, where the dedicated area is within the electronics department of the store. The product category in this case is televisions, and many televisions are for sale in the department, but only a subset of the televisions determined to be identified products in accordance with the method of FIG. 1.

Figure 5:
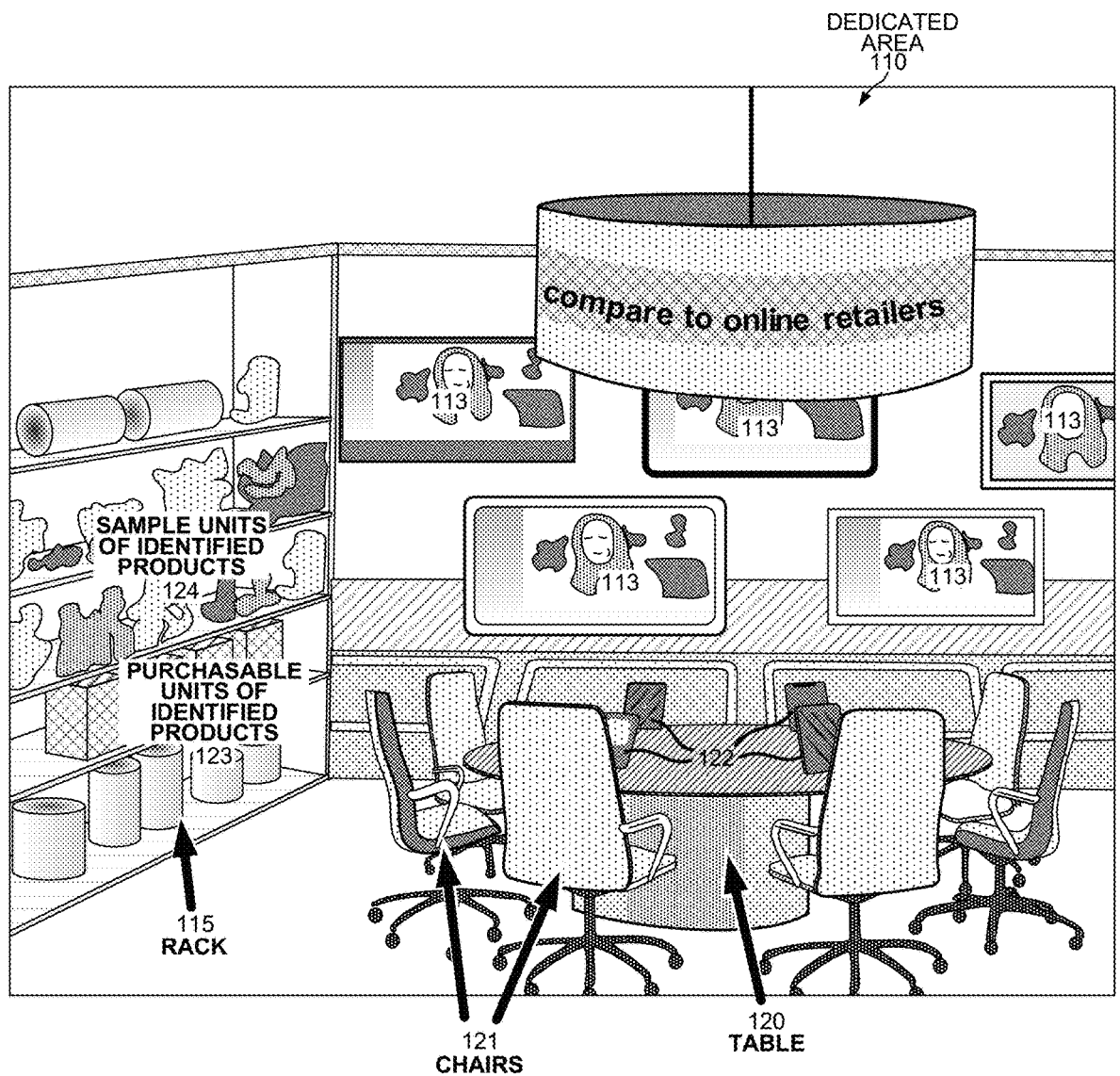
FIG. 5 is a diagram of a second example of a "dedicated area" inside a physical retail store where descriptive information about particular identified products is provided to customers, where sample units of the identified products are provided to customers, and where purchasable units of the identified products are provided to customers.

FIG. 5 is a diagram of a second example of the "dedicated area" described above in connection with FIG. 1. The dedicated area 110 in this case is an area that includes a table 120, chairs 121, a plurality of web-page-browsing, network-connected, touch screen devices 122, large screen displays 113, and a rack 115 of the identified products. This dedicated area 110 may be strategically located close to the main entry of the physical retail store. In one example, there is only one such dedicated area 110 in the store. This single dedicated area is identified by reference numeral 110 in FIG. 2. The foot traffic of the entering customers of the retail store 108 passes by the dedicated area 110. Passing customers are made aware of the identified products using the large screen displays 113. An interested customer can then use the touch screen devices 122 on the table 120 to check web pages of the on-line retail company, to confirm that the on-line retail company is indeed offering an identified product for a higher price than the physical retail store. In one example, the browsing capability of the web page browsing touch screen devices 122 is restricted so that the touch screen devices, as provided by the store 108, are only usable by customers to browse certain predetermined web content of the on-line retailer and certain predetermined web content served by the owner of the physical retail store. The touch screen devices 122 may only be usable to browse predetermined web pages of the on-line retail company that show identified products, and to browse other select web pages published by the owner of the physical retail store. For example, the touch screen devices 122 may only be usable to browse through certain HTML pages served locally by the physical retail store, in which case the touch screen devices 122 may not be usable to browse internet content. In the example of FIG. 5, a purchasable unit 123, along with a sample unit 124, is provided in the rack 115 for each of the identified products. The sample units 124 are typically presented for customer viewing outside of any shipping box or container or packing. After inspecting such a sample unit 124, an interested customer can then easily obtain a purchasable packaged unit 123 of the same identified product from the rack 115, and physically take the purchasable unit to the checkout area of the store, and purchase the unit, and then immediately take the unit away from the store. For example, the customer can immediately after purchase take the purchased item from the store to the customer's home.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A structure comprising:
 a physical building having a plurality of product category areas, wherein the physical building houses a physical retail store, wherein the physical retail store has an owner;
 retail products disposed in the building, wherein each of the retail products belongs to a corresponding one and only one product category, and wherein the retail products are physically arranged in the physical building according to product category so that only products of a product category are physically disposed in the product category area for a corresponding product category; and
 a dedicated area within the physical building that contains:
  1) a plurality of identified products, wherein the identified products are retail products from multiple different ones of the product categories, wherein each of the identified products in the dedicated area is a physical purchasable unit that is being offered for sale to customers in the physical retail store and that can be purchased by a customer and can be physically taken away from the physical retail store by the customer immediately following the purchase; and
  2) a fixed display that displays descriptive information about each identified product, wherein the fixed display is not movable by customers in the physical retail store, wherein the descriptive information about each identified product includes: 1) an identification of the identified product, 2) an identification of an on-line retail company that is currently offering the identified product for sale on-line, 3) a price at which the identified product is being offered for sale on-line by the on-line retail company, and 4) a price at which the identified product is offered for sale at the physical retail store by the owner of the physical retail store, wherein the owner of the physical retail store and the on-line retail company are two different competing commercial entities, wherein in the dedicated area there are substantially no products present for which an on-line price at which the product is being offered for sale on-line by an on-line retail company is not being displayed by the fixed display, and wherein the fixed display is taken from the group consisting of: the display of a touch screen device, the display of a touch screen web browsing device, a large screen monitor, a placard, a sticker, a display of a kiosk, printed material disposed on a kiosk, a printed flyer, a printed brochure, a combination of an electronic display and printed material.

2. The structure of claim 1, wherein the descriptive information is displayed on the fixed display in a size large enough that customers standing ten feet away from the fixed display can read the descriptive information.

3. The structure of claim 1, wherein the dedicated area includes a network browsing device that is provided by the owner of the physical retail store and that is usable by customers in the dedicated area to view web pages of the on-line retail company.

4. A method involving:
 (a) identifying, for each of a plurality of categories of physical products offered for sale by an on-line retail company, a subset of the products of the category;
 (b) providing to a customer, at a dedicated area inside a physical retail store, descriptive information about each product identified in (a), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store by an owner of the physical retail store;
 (c) providing, inside the physical retail store, a physical purchasable unit of each product identified in (a), wherein each of the physical purchasable units is offered for sale to the customer and can be purchased by the customer and can be physically taken away from the physical retail store by the customer immediately following the purchase, wherein the owner of the physical retail store and the on-line retail company are two different competing commercial entities, and wherein (a), (b) and (c) are performed by the owner of the physical retail store; and (d) providing, at the dedicated area, a physical sample of each of the products identified in (a), wherein the dedicated area is a single dedicated area within the physical retail store, wherein all the physical samples provided in (d) are disposed in the single dedicated area, and wherein substantially no products other than the samples of the products identified in (a) and physical purchasable units of the products identified in (a) are present in the single dedicated area.

5. The method of claim 4, wherein the on-line retail company is identified in (b) by name.

6. The method of claim 4, wherein the identifying of (a) involves identifying products of a category based at least in part on sales data for each product of the category.

7. The method of claim 4, wherein the identifying of (a) involves identifying products of a category based at least in part on customer review data for each product of the category.

8. The method of claim 4, wherein the identifying of (a) involves identifying products of a category based at least in part on estimated sales volume data for each product of the category.

9. A method involving:
(a) identifying, for each of a plurality of categories of physical products offered for sale by an on-line retail company, a subset of the products of the category;
(b) providing to a customer, at a dedicated area inside a physical retail store, descriptive information about each product identified in (a), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store by an owner of the physical retail store;
(c) providing, inside the physical retail store, a physical purchasable unit of each product identified in (a), wherein each of the physical purchasable units is offered for sale to the customer and can be purchased by the customer and can be physically taken away from the physical retail store by the customer immediately following the purchase, wherein the owner of the physical retail store and the on-line retail company are two different competing commercial entities, and wherein (a), (b) and (c) are performed by the owner of the physical retail store; and
(d) providing an electronic display device at the dedicated area, wherein the electronic display device is usable by the customer to browse web pages of the on-line retail company, wherein the web-pages advertise the products identified in (a).

10. The method of claim 9, wherein the electronic display device is a part of a network browsing device, the method further comprising:
(e) restricting a browsing capability of the network browsing device so that the network browsing device is only usable by a customer to browse certain predetermined web content.

11. A method involving:
(a) identifying, for each of a plurality of categories of physical products offered for sale by an on-line retail company, a subset of the products of the category;
(b) providing to a customer, at a dedicated area inside a physical retail store, descriptive information about each product identified in (a), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store by an owner of the physical retail store; and
(c) providing, inside the physical retail store, a physical purchasable unit of each product identified in (a), wherein each of the physical purchasable units is offered for sale to the customer and can be purchased by the customer and can be physically taken away from the physical retail store by the customer immediately following the purchase, wherein the owner of the physical retail store and the on-line retail company are two different competing commercial entities, and wherein (a), (b) and (c) are performed by the owner of the physical retail store, wherein the descriptive information is provided to the customer in (b) by displaying the descriptive information on a large screen display, wherein the large screen display is disposed at the dedicated area and is not movable by the customer.

12. The method of claim 11, further comprising:
(d) providing a touch screen device at the dedicated area, wherein the touch screen device is usable by the customer to browse web pages of the on-line retail company, wherein the web pages advertise the products identified in (a), and wherein the touch screen device is a different device from the large screen display upon which the descriptive information is provided in (b).

13. A method involving:
(a) identifying, for each of a plurality of categories of physical products offered for sale by an on-line retail company, a subset of the products of the category;
(b) providing to a customer, at a dedicated area inside a physical retail store, descriptive information about each product identified in (a), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store by an owner of the physical retail store; and
(c) providing, inside the physical retail store, a physical purchasable unit of each product identified in (a), wherein each of the physical purchasable units is offered for sale to the customer and can be purchased by the customer and can be physically taken away from the physical retail store by the customer immediately following the purchase, wherein the owner of the physical retail store and the on-line retail company are two different competing commercial entities, wherein (a), (b) and (c) are performed by the owner of the physical retail store, and wherein the descriptive information is provided to the customer in (b) by displaying the descriptive information on an object or objects taken from the group consisting of: a placard, a sticker, a display of a kiosk, printed material disposed on a kiosk, a printed flyer, a printed brochure, a combination of an electronic display and printed material.

14. A method involving:
(a) identifying, for each of a plurality of categories of physical products offered for sale by an on-line retail company, a subset of the products of the category;
(b) providing to a customer, at a dedicated area inside a physical retail store, descriptive information about each product identified in (a), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store by an owner of the physical retail store;
(c) providing, inside the physical retail store, a physical purchasable unit of each product identified in (a), wherein each of the physical purchasable units is offered for sale to the customer and can be purchased by the customer and can be physically taken away from the physical retail store by the customer immediately following the purchase, wherein the owner of the physical retail store and the on-line retail company are two different competing commercial entities, and wherein (a), (b) and (c) are performed by the owner of the physical retail store; and
(d) providing a touch screen device at the dedicated area, wherein the touch screen device is usable by the customer to browse through predetermined information, and wherein a web browsing capability of the touch screen device has been restricted so that the touch screen device is not usable by the customer to view certain web content.

15. A method involving:
(a) identifying, for a first category of physical products offered for sale by an on-line retail company, a subset of the products of the first category;
(b) providing, at a first dedicated area inside a physical retail store, descriptive information about each product identified in (a), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store;
(c) identifying, for a second category of physical products offered for sale by the on-line retail company, a subset of the products of the second category;
(d) providing, at a second dedicated area inside the physical retail store, descriptive information about each product identified in (c), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store;
(e) providing, inside the physical retail store, a physical purchasable unit of each product identified in (a) and each product identified in (c), wherein each of the physical purchasable units is offered for sale to a customer and can be purchased by the customer and can be physically taken away from the physical retail store by the customer immediately following the purchase, wherein the owner of the physical retail store and the on-line retail company are two different competing commercial entities, and wherein (a), (b), (c), (d) and (e) are performed by the owner of the physical retail store;
(f) providing a first kiosk at the first dedicated area, wherein the first kiosk comprises a first display, and wherein at least some of the descriptive information provided in (b) is displayed on the first kiosk; and
(g) providing a second kiosk at the second dedicated area, wherein the second kiosk comprises a second display, and wherein at least some of the descriptive information provided in (d) is displayed on the second kiosk.

16. A method involving:
(a) identifying, for a first category of physical products offered for sale by an on-line retail company, a subset of the products of the first category;
(b) providing, at a first dedicated area inside a physical retail store, descriptive information about each product identified in (a), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store;
(c) identifying, for a second category of physical products offered for sale by the on-line retail company, a subset of the products of the second category;
(d) providing, at a second dedicated area inside the physical retail store, descriptive information about each product identified in (c), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store;
(e) providing, inside the physical retail store, a physical purchasable unit of each product identified in (a) and each product identified in (c), wherein each of the physical purchasable units is offered for sale to a customer and can be purchased by the customer and can be physically taken away from the physical retail store by the customer immediately following the purchase, wherein the owner of the physical retail store and the on-line retail company are two different competing commercial entities, and wherein (a), (b), (c), (d) and (e) are performed by the owner of the physical retail store, wherein the first dedicated area includes a first display rack, and wherein the second dedicated area includes a second display rack.

17. A structure comprising:
a physical building having a plurality of product category areas, wherein the physical building houses a physical retail store, wherein the physical retail store has an owner;
retail products disposed in the building, wherein each of the retail products belongs to a corresponding one and only one product category, and wherein the retail products are physically arranged in the physical building according to product category so that only products of a product category are physically disposed in the product category area for a corresponding product category; and
a dedicated area within the physical building that contains:
1) a plurality of identified products, wherein the identified products are retail products from multiple different ones of the product categories, wherein each of the identified products in the dedicated area is a physical purchasable unit that is being offered for sale to customers in the physical retail store and that can be purchased by a customer and can be physically taken away from the physical retail store by the customer immediately following the purchase; and 2) a fixed display that displays descriptive information about each identified product, wherein the fixed display is not movable by customers in the physical retail store, wherein the descriptive information about each identified product includes: 1) an identification of the identified product, 2) an identification of an on-line retail company that is currently offering the identified product for sale on-line, 3) a price at which the identified product is being offered for sale on-line by the on-line retail company, and 4) a price at which the identified product is offered for sale at the physical retail store by the owner of the physical retail store, wherein the owner of the physical retail store and the on-line retail company are two different commercial entities, wherein in the dedicated area there are substantially no products present for which an on-line price at which the product is being offered for sale on-line by an on-line retail company is not being displayed by the fixed display, and wherein the fixed display is taken from the group consisting of: the display of a touch screen device, the display of a touch screen web browsing device, a large screen monitor, a placard, a sticker, a display of a kiosk, printed material disposed on a kiosk, a printed flyer, a printed brochure, a combination of an electronic display and printed material.

18. A method involving:
(a) identifying, for each of a plurality of categories of physical products offered for sale by an on-line retail company, a subset of the products of the category;
(b) providing to a customer, at a dedicated area inside a physical retail store, descriptive information about each product identified in (a), wherein the descriptive information includes: 1) an identification of the product, 2) an identification of the on-line retail company, 3) a price at which the identified product is offered for sale on-line by the on-line retail company, and 4) a price at which the identified product is offered for sale at the physical retail store by an owner of the physical retail store;
(c) providing, inside the physical retail store, a physical purchasable unit of each product identified in (a), wherein each of the physical purchasable units is offered for sale to the customer and can be purchased by the customer and can be physically taken away from the physical retail store by the customer immediately following the purchase, wherein the owner of the physical retail store and the on-line retail company are two different commercial entities, and wherein (a), (b) and (c) are performed by the owner of the physical retail store; and
(d) providing, at the dedicated area, a physical sample of each of the products identified in (a), wherein the dedicated area is a single dedicated area within the physical retail store, wherein all the physical samples provided in (d) are disposed in the single dedicated area, and wherein substantially no products other than the samples of the products identified in (a) and physical purchasable units of the products identified in (a) are present in the single dedicated area.

* * * * *